(12) United States Patent
Sayyed et al.

(10) Patent No.: US 11,609,756 B2
(45) Date of Patent: Mar. 21, 2023

(54) METHOD FOR CONTEXTUAL FIRMWARE UPDATE BASED ON HARDWARE STATE AND TELEMETRY

(71) Applicant: Dell Products L.P., Round Rock, TX (US)

(72) Inventors: Ibrahim Sayyed, Georgetown, TX (US); Alok Pant, Austin, TX (US); Nikhil Manohar Vichare, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 98 days.

(21) Appl. No.: 17/324,356

(22) Filed: May 19, 2021

(65) Prior Publication Data

US 2022/0374221 A1 Nov. 24, 2022

(51) Int. Cl.
*G06F 8/65* (2018.01)
*G06N 20/00* (2019.01)
*G06F 9/445* (2018.01)

(52) U.S. Cl.
CPC ............ *G06F 8/65* (2013.01); *G06F 9/44505* (2013.01); *G06N 20/00* (2019.01)

(58) Field of Classification Search
CPC ........ G06F 8/65; G06F 9/44505; G06N 20/00
See application file for complete search history.

(56) References Cited

U.S. PATENT DOCUMENTS

| | | | |
|---|---|---|---|
| 9,467,465 B2* | 10/2016 | Hibbert | H04L 63/1433 |
| 2015/0026027 A1* | 1/2015 | Priess | G06Q 50/265 |
| | | | 705/35 |
| 2015/0339477 A1* | 11/2015 | Abrams | H04L 63/1416 |
| | | | 726/23 |
| 2016/0300059 A1* | 10/2016 | Abrams | H04L 63/0263 |
| 2020/0357060 A1* | 11/2020 | Dalinina | G06K 9/6232 |
| 2021/0385297 A1* | 12/2021 | Long | H04L 67/025 |
| 2021/0400075 A1* | 12/2021 | Stergioudis | G06F 21/604 |

* cited by examiner

*Primary Examiner* — Daxin Wu
(74) *Attorney, Agent, or Firm* — McDermott Will & Emery LLP (57) ABSTRACT

Managing firmware updates of an information handling system (IHS), including performing, at a first time, a calibration and configuration of a firmware update risk model, including: identifying predictor data associated with a plurality of IHS; training, based on the predictor data, the firmware update risk model, including generating a configuration policy including configuration rules, the configuration rules for performing computer-implemented actions responsive to a firmware update; receiving, at a second time, the firmware update at a particular IHS, and in response: identifying particular predictor data of the particular IHS; in response to identifying the particular predicator data of the particular IHS, i) accessing the firmware update risk model including the configuration policy, ii) identifying one or more of the configuration rules based on the identified particular predicator data, and iii) applying the one or more configuration rules to perform computer-implemented actions responsive to receiving the firmware update.

20 Claims, 3 Drawing Sheets

METHOD FOR CONTEXTUAL FIRMWARE UPDATE BASED ON HARDWARE STATE AND TELEMETRY

BACKGROUND

Field of the Disclosure

The disclosure relates generally to an information handling system, and in particular, managing firmware updates of the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Firmware updates at information handling systems can be critical for platform stability, security, and enhancement of underlying capability. There can be observations of unexplained failed update scenarios where the system can become unstable or non-functional, leading to expensive costs including hardware replacements, loss of productivity, etc. Furthermore, the cost and perceived high risk of an update may lead to users to delay essential critical firmware updates making those system vulnerable or unstable.

SUMMARY

Innovative aspects of the subject matter described in this specification may be embodied in a method of managing firmware updates of an information handling system, including performing, at a first time, a calibration and configuration of a firmware update risk model, including identifying predictor data associated with a plurality of information handling systems, the predictor data including, for each information handling system, hardware context of the information handling system, historical information of the information handling system, and a firmware state of the information handling system; training, based on the predictor data, the firmware update risk model, including generating a configuration policy including configuration rules, the configuration rules for performing computer-implemented actions responsive to a firmware update; receiving, at a second time, the firmware update at a particular information handling system, and in response: identifying particular predictor data of the particular information handling system; in response to identifying the particular predicator data of the particular information handling system, i) accessing the firmware update risk model including the configuration policy, ii) identifying one or more of the configuration rules based on the identified particular predicator data, and iii) applying the one or more configuration rules to perform computer-implemented actions responsive to receiving the firmware update.

Other embodiments of these aspects include corresponding systems, apparatus, and computer programs, configured to perform the actions of the methods, encoded on computer storage devices.

These and other embodiments may each optionally include one or more of the following features. For instance, the hardware context, for each information handling system, includes parameters related to one or more of a hard disk drive of the information handling system, a memory of the information handling system, a battery health of the information handling system, a serial peripheral wear of the information handling system, a fan of the information handling system, and a temperature of the information handling system. The historical information, for each information handling system, includes parameters related to one or more of a basic input/output system of the information handling system, previous firmware updates of the information handling system, and an operating system driver relationship. The firmware state, for each information handling system, includes parameters related to one or more of basic input/output system settings of the information handling system, and a size of the firmware update. Generating the configuration policy further includes generating firmware update risk scores based on the predictor data, wherein each of the configuration rules is associated with a range of firmware update risk scores. Identifying one or more of the configuration rules based on the identified particular predicator data further comprises identifying a particular firmware update risk score based on the particular predicator data, and identifying the one or more configuration rules based on the particular firmware update risk score. The one or more computer-implemented actions include applying the firmware update selectively, blocking the firmware update, adjusting a firmware setup configuration, restore and updating recovery files, staging the firmware update, and backing up recovery files.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This disclosure discusses methods and systems for managing firmware updates of an information handling system.

In short, during deployment of the firmware updates, several factors can be incorporated to determine a stability of a system for installation of the firmware update—including historical telemetry and state data, hardware state, system configuration, firmware configuration, and other factors of the system to describe the underlying patterns. A corresponding model (e.g., on the "cloud") can be generated, and along with data from an individual system, this model can be used to provide contextual recommendations in response to the firmware update. For example, such actions as backup, critical versus full firmware update, and/or planned recovery action if firmware update fails.

Specifically, this disclosure discusses a system and a method for managing firmware updates of an information handling system, including performing, at a first time, a calibration and configuration of a firmware update risk model, including: identifying predictor data associated with a plurality of information handling systems, the predictor data including, for each information handling system, hardware context of the information handling system, historical information of the information handling system, and a firmware state of the information handling system; training, based on the predictor data, the firmware update risk model, including generating a configuration policy including configuration rules, the configuration rules for performing computer-implemented actions responsive to a firmware update; receiving, at a second time, the firmware update at a particular information handling system, and in response: identifying particular predictor data of the particular information handling system; in response to identifying the particular predicator data of the particular information handling system, i) accessing the firmware update risk model including the configuration policy, ii) identifying one or more of the configuration rules based on the identified particular predicator data, and iii) applying the one or more configuration rules to perform computer-implemented actions responsive to receiving the firmware update.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 1:
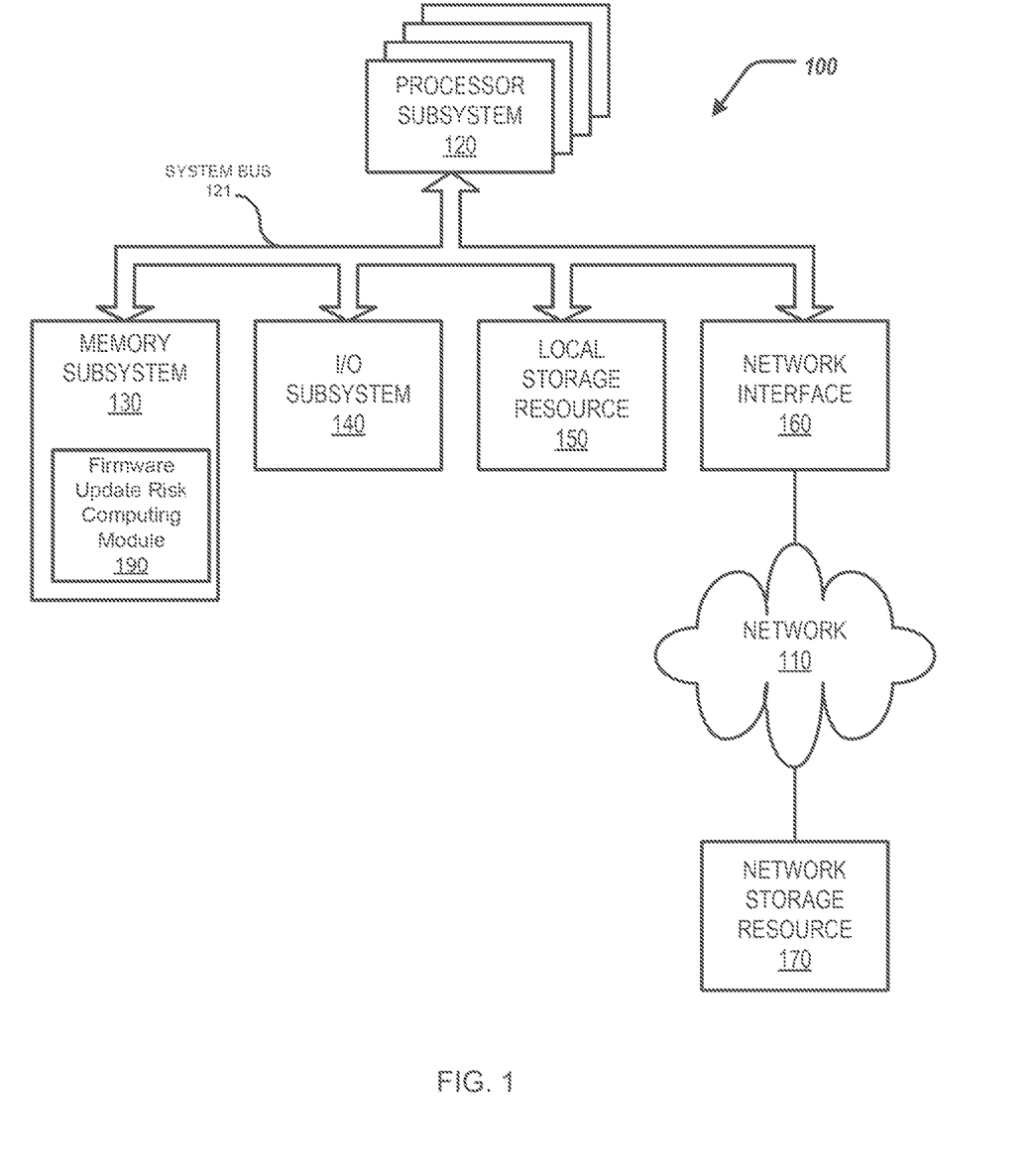
FIG. 1 is a block diagram of selected elements of an embodiment of an information handling system.
Figure 2:
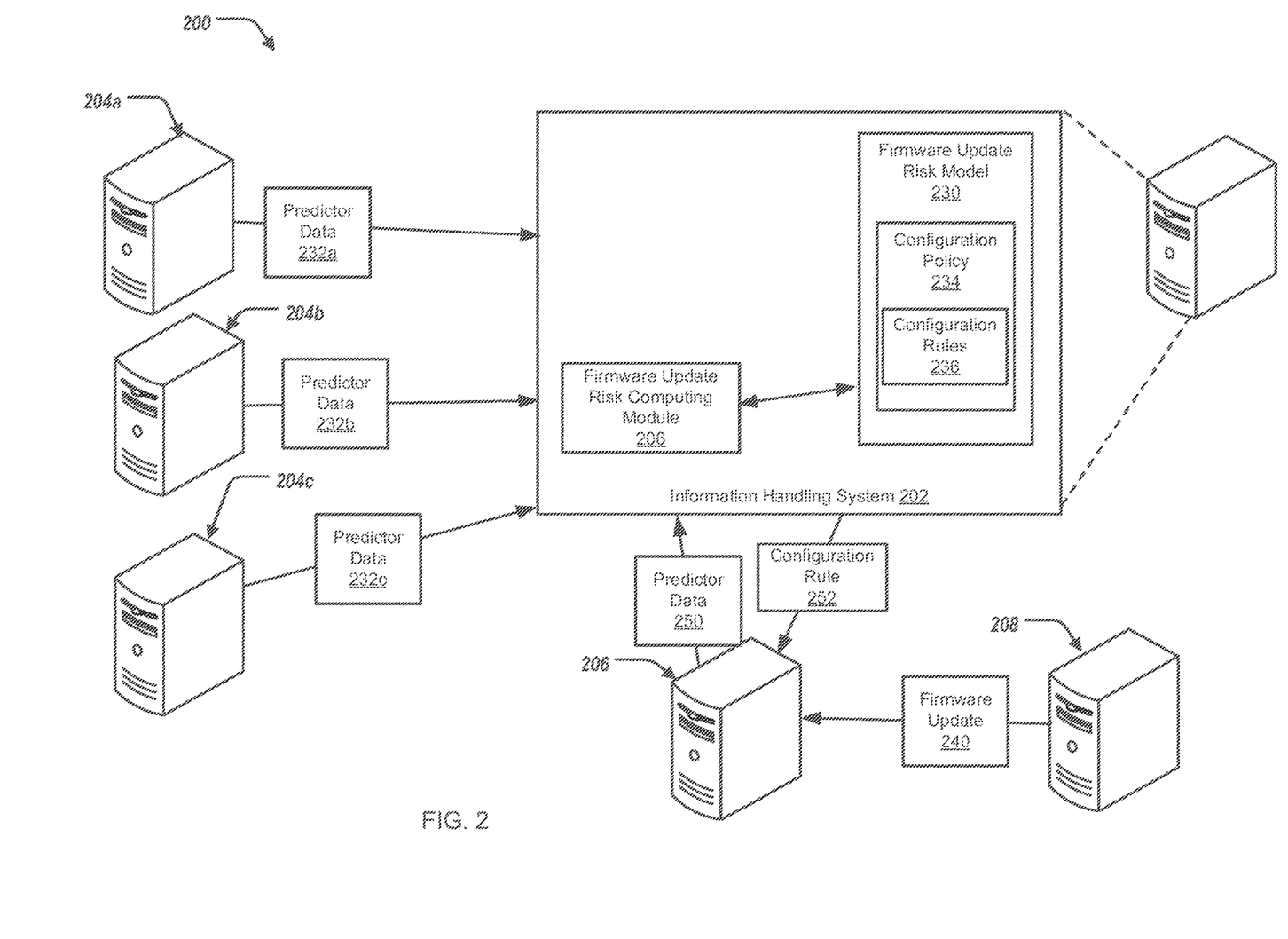
FIG. 2 illustrates a block diagram of the information handling system for managing firmware updates of an information handling system.
Figure 3:
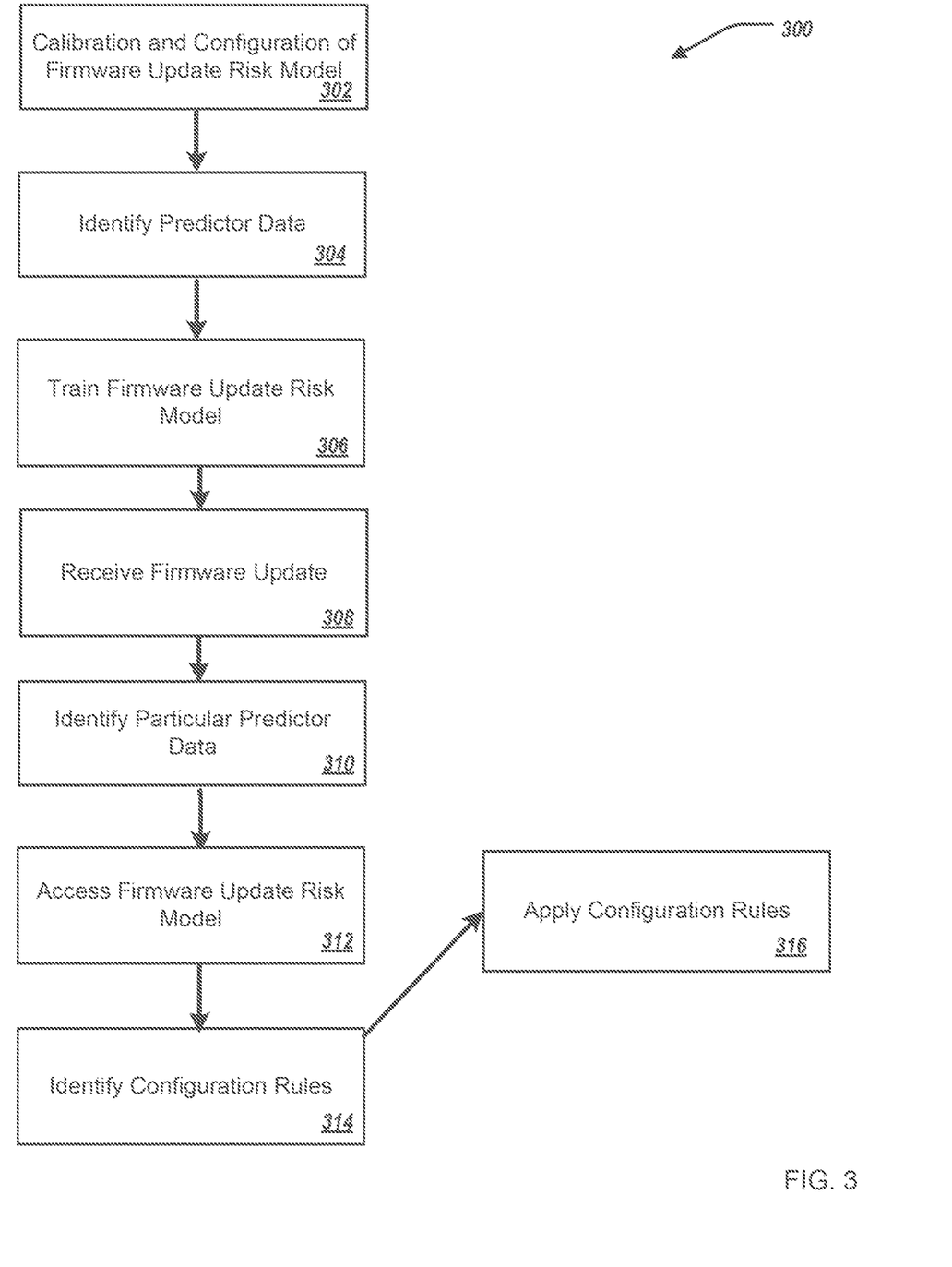
FIG. 3 illustrates a method for managing firmware updates of an information handling system.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a firmware update risk computing module 190. The firmware update risk computing module 190 can be included by the memory subsystem 130. The firmware update risk computing module 190 can include a computer-executable program (software). The firmware update risk computing module 190 can be executed by the processor subsystem 120.

In short, the firmware update risk computing module 190 can facilitate installation of firmware updates. The firmware update risk computing module 190 can incorporate several factors to determine a stability of a system for installation of the firmware update—including historical telemetry and state data, hardware state, system configuration, firmware configuration, and other factors of the system to describe the underlying patterns. The firmware update risk computing module 190 can generate a corresponding model (e.g., on the "cloud"). The model along with data from an individual system can be used by the firmware update risk computing module 190 to provide contextual recommendations in response to the firmware update—e.g., backup, critical versus full firmware update, and/or planned recovery action if firmware update fails.

Turning to FIG. 2, FIG. 2 illustrates an environment 200 including an information handling system 202, information handling systems 204a, 204b, 204c (collectively referred to as information handling systems 204), an information handling system 206, and an information handling system 208. The information handling system 202 can include a firmware update risk computing module 220. In some examples, any of the information handling systems 202, 204, 206, 208 are similar to, or include, the information handling system 100 of FIG. 1. In some examples, the firmware update risk computing module 220 is the same, or substantially the same, as the firmware update risk computing module 190 of FIG. 1.

The information handling system 202 can be in communication with the information handling systems 204 and 206 over one or more networks (e.g., the Internet). The information handling system 208 can be in communication with the information handling system 206 over one or more networks (e.g., the Internet).

In some embodiments, the firmware update risk computing module 220 can perform, at a first time, a calibration and configuration of a firmware update risk model 230. Specifically, performing of the calibration and the configuration of the firmware update risk model 230 can include identifying predictor data 232 associated from each of the information handling system 204. Specifically, the information handling system 204a can provide the predictor data 232a to the information handling system 202, the information handling system 204b can provide the predictor data 232b to the information handling system 202, and the information handling system 204c can provide the predictor data 232c to the information handling system (predictor data 232a, 232b, 232c collectively referred to as predictor data 232). The information handling systems 204 can provide the respective predictor data 232 in response to a request from the information handling system 202, or automatically. In some examples, the information handling systems 204 can provide the predictor data 232 periodically, e.g., every 1 millisecond, 1 second, 1 minute, 1 hour, 1 day.

In some examples, the predictor data 232 can include, for each of the information handling systems 204, a hardware context of the information handling system 204. The hardware context can include parameters related to one or more of a hard disk drive (HDD) of the information handling system 204, a memory (dynamic random-access memory (DRAM)) of the information handling system 204, a battery health of the information handling system 204, a serial peripheral interface (SPI) wear of the information handling system 204, a fan of the information handling system 204, and a temperature of the information handling system 204. In some examples, the hardware context can include a system name and hardware configuration of the information handling system 204; a boot time of the information handling system 204; memory error counts (dual in-line memory module (DIMM) and HDD self-monitoring analysis and reporting technology (SMART) errors) of the information handling system 204; storage media and recovery image version of the information handling system 204; processor temperature of the information handling system 204; battery temperature of the information handling system 204; and absent HDD backup or corrupted encapsulating security payload (ESP) partition of the information handling system 204.

In some examples, the predictor data 232 can include, for each of the information handling systems 204, historical information of the information handling system 204. The historical information can include parameters related to one or more of a basic input/output system (BIOS) of the information handling system 204, previous firmware updates of the information handling system 204, and an operating system (OS) driver relationship. In some examples, the historical information can include a previous BIOS version number and an updated BIOS version number of the information handling system 204; delta changes between the previous BIOS and the updated BIOS of the information handling system 204; restrictions such as backward and forward capability of the information handling system 204; boot failures (power-on self-test (POST) and OS failures such as blue screen of death (BSOD)) of the information handling system 204; past system crashes of the information handling system 204; user reported boot failures of the information handling system 204; bitlocker and trust platform module (TPM) reported past flash failures of the information handling system 204; stalled firmware of the information handling system 204; and previous firmware updates of the information handling system 204.

In some examples, the predictor data 232 can include, for each of the information handling systems 204, a firmware state of the information handling system 204. The firmware state information can include parameters related to one or more of BIOS system settings, and a size of the firmware update. In some examples, the firmware state information can include power and system BIOS logs of the information handling system 204; external firmware version (dock, NVMe, thunderbolt, TPM) associated with the information handling system 204; drivers of the information handling system 204; BIOS configuration of the information handling system 204; firmware configuration of the information handling system 204; and reported diagnostic counts of the information handling system 204.

The firmware update risk computing module 220 can train, based on the predictor data 232, the firmware update risk model 230. Specifically, the firmware update risk computing module 220 can generate, based on the predictor data 232 identified at the first time, a configuration policy 234 that includes configuration rules 236. In some examples, the configuration rules 236 are rules for performing computer-implemented actions responsive to a firmware update 240.

To that end, the firmware update risk computing module 220 can train the firmware update risk model 230 to establish connections between the predictor data 232 and the configuration rules 236. Specifically, the firmware update risk model 230 can identify one or more configurations rules 236 to be applied based on a connection with one or more of the predictor data 232.

In some examples, the firmware update risk computing module 220 can train the firmware update risk model 230 using a machine learning process, and/or a neural network. For example, the firmware update risk computing module 220 can obtain predictor data 232 over a first time period. The predicator data 232 can be in response, or based on, installation (or attempted installation) of a firmware update at the information handling system, including the firmware update 240. That is, the firmware update risk computing module 220 can identify (receive) the predicator data 232 of the information handling systems 204 in response to installation of the firmware update 240 at the respective information handling system 204, or attempted installation of the firmware update 240 at the respective information handling system 204. In other words, the firmware update risk computing module 220 can identify (receive) the predicator data 232 of the information handling systems 204 that is responsive to (based on) the firmware update 240 installation at the information handling system 204 (or attempted installation). The firmware update risk computing module 220 can then train the firmware update risk model 230 based on the predicator data 232 and the result of the firmware update 240 installation (or attempted installation) (e.g., using a machine learning process, and/or a neural network). Such machine learning processes can include tree-based models such as Random Forest, XGBoost, Adaboost; and/or deep neural networks, and support vector machines.

In some examples, the configuration rules 236 can include selectively applying the firmware update 240 (BIOS update), blocking the firmware update 240 (BIOS update), adjusting (changing) a firmware setup configuration (BIOS setup configuration), restoring and updating recovery files (BIOS recovery files), backing up recovery files, and staging the firmware update 240 (BIOS update). In some examples, the configuration rules 236 can include restoring back recovery files on an ESP partition; mandating an AC requirement, and adjusting BIOS configuration changes.

In some examples, the firmware update risk computing module 220 can generate the configuration policy 234 by generating firmware update risk scores based on the predicator data 232. Each of the configuration rules 236 of the configuration policy 234 can be associated with a range of firmware update risk scores. Specifically, based on the predictor data 232 that is responsive to the installation of the firmware update 240, for one or more combinations of the parameters of the predictor data 232, the firmware update risk computing module 220 can assign a firmware update risk score to the combination of parameters of the predicator data 232. For example, the risk scores can range from 0 to 1 (normalized). A risk score of 1 can be considered "high-risk" based on the predictor data 232, and a risk score of 0 can be considered "low-risk" based on the predictor data 232.

For example, the predicator data 232 can indicate a battery health of the associated information handling system 204. In particular, the battery health of the predicator data 232 can indicate that the battery is experiencing intermittent failures (soft failures), e.g., due to over voltage. The firmware update risk computing module 220 can generate the configuration policy 234 by generating firmware update risk scores based on the indicated battery health (of the predicator data 232). Specifically, the firmware update risk computing module 220 can generate a configuration rule 236 associated with a firmware update risk score (e.g., greater that 0.7) that indicates a high risk of update of installation of the firmware update 240 when the predicator data 232 indicates poor battery health (e.g., the information handling system is on battery and not AC power, or if the firmware update 240 includes a battery firmware update). The configuration rule 236 can further include performing computer-implemented actions responsive to the firmware update 240 such as only performing the firmware update when the information handling system is connected to AC power source, or selectively applying the firmware update 240 (e.g., skip applying portions of the firmware update 240 that can affect the battery).

For example, the predicator data 232 can indicate failures/crashes/abnormal shutdowns of the associated information handling system 204. The firmware update risk computing module 220 can generate the configuration policy 234 by generating a firmware update risk score based on the failure status (of the predicator data 232). Specifically, the firmware update risk computing module 220 can generate a configuration rule 236 associated with a firmware update risk score (e.g., greater than 0.7) that indicates a high risk of installation of the firmware update 240 when the predictor data 232 indicates failures/crashes/abnormal shutdowns. The configuration rule 236 can further include performing computer-implemented actions responsive to the firmware update 240 such as updating specific device drivers of the firmware update 240 related to the failures/crashes/abnormal shutdowns before other portions of the firmware update 240; or performing a system restore to a previously known valid restore point prior to applying the firmware update 240.

In some examples, the firmware update risk computing module 220 can train the firmware update risk model 230 and generate the configuration policy 234 using supervised regression machine learning. For example, the firmware update risk computing module 220 can generate a risk score (between 0 and 1) for one or more particular combinations of the predictor data 232, and store such associations between the predictor data 232 combinations and risk score at the risk model 230.

In some examples, the firmware update risk computing module 220 can train the firmware update risk model 230 and generate the configuration policy 234 using supervised classification machine learning. For example, the firmware update risk computing module 220 can generate risk groupings/ranges based on the predictor data 232 and store such risk groupings/ranges at the risk model 230. For example, the firmware update risk computing module 230 can determine that a risk score between 0 and x (e.g., 0-0.25) can be classified as low-risk; a risk score between x and y (e.g., 0.26-0.75) can be classified as medium-risk; and a risk score between y and z (e.g., 0.76-1) can be classified as high-risk. However, other groupings/ranges are possible (and other thresholds), including other classifications of such groupings/ranges In some examples, the firmware update risk computing module 220 can generate the configuration policy 234 using traditional risk assessment. For example, each of the predictor data 232 can be associated with a particular risk score. The firmware update risk computing module 220 can determine the risk score, for a particular set of predictor data 232, based on the cumulative risk score for each predictor data 232 (e.g., summation of risk scores).

For example, the firmware update risk computing module 220 can analyze the predicator data 232, and assign a score for such combination of predicator data 232, e.g., a risk score, associated with installation of the firmware update 240. The firmware update risk computing module 220 can update the configuration policy 234 such that each of the configuration rules 236 can be associated with a range of firmware update risk scores. For example, for a high risk score (e.g., greater than 0.76), a particular configuration rule 236 (or rules 236) can be associated with such range of high risk scores, and include the action responsive to the firmware update 240 of blocking the firmware update 240. For example, for a low risk score (e.g., less than 0.25), a particular configuration rule 236 (or rules 236) can be associated with such range of low risks scores, and include the action responsive to the firmware update 240 of installing (or applying) the firmware update 240.

The information handling system 206 can receive, at a second time, the firmware update 240 from the information handling system 208. For example, the firmware update 240 can be a "push" update from the information handling system 208. The firmware update 240 can be provided automatically, or in response to a request from the information handling system 206. The information handling system 206 can check periodically with the information handling system 208 for the firmware update 240. In some examples, the information handling system 208 can be considered a supervisor, or manager, of the information handling system 206.

The information handling system 202 can identify particular predictor data 250 associated with the information handling system 206. Specifically, the information handling system 206 can provide the predictor data 250 to the information handling system 202. The information handling systems 206 can provide the predictor data 250 in response to receiving the firmware update 240.

The information handling system 202, in response to identifying the predictor data 250 of the information handling system 206, can access the firmware updater risk model 230 including the configuration policy 234. The firmware update risk computing module 220 can further identify one or more of the configuration rules 236 based on the predictor data 250. Furthermore, the firmware update risk computing module 220 can apply the configuration rules 236 to the information handling system 220. In other words, the firmware update risk computing module 220 can apply appropriate configuration rules 234 based on the predictor data 250 as provided by the firmware update risk model 230. In some examples, the firmware update risk computing module 220 can apply the configuration rules 234 to perform computer-implemented actions responsive to the receiving the firmware update 240.

Specifically, the information handling system 202, after identifying the configuration rules 236 based on the predicator data 250, can provide the identified configuration rule (or rules) 250 (from the configuration rules 236) to the information handling system 206. The information handling system 206 can apply the configuration rule 252 in response to the firmware update 240 (the information handling system 206 receiving the firmware update 240). For example, the information handling system 202 can receive the predictor data 250, and the firmware update risk computing module 220 can identify the configuration rule 252 (or rules 252) from the configuration rules 236 based on connections between the values of the predicator data 250 and the configuration rules 236 (as determined during the training of the firmware update risk model 230, mentioned above). The configuration rule 252 can include any of the configuration rules 236, including selectively applying the firmware update 240 (BIOS update), blocking the firmware update 240 (BIOS update), adjusting (changing) a firmware setup configuration (BIOS setup configuration, restoring and updating recovery files (BIOS recovery files), backing up recovery files, and staging the firmware update 240 (BIOS update). In some examples, the configuration rules 236 can include restoring back recovery files on an ESP partition; mandating an AC requirement, and adjusting BIOS configuration changes, based on the predicator data 250 and the firmware update risk model 230.

For example, the firmware update risk computing module 220 can analyze the predicator data 250, and assign a score for such combination of predicator data 250, e.g., the risk score, for installation of the firmware update 240 at the information handling system 206.

The firmware update risk computing module 220 can access the firmware update risk model 230, and based on the predicator data 250 and the risk score for the predictor data 250, identify the configuration rule 252 that is associated with the risk score. For example, for a high risk score (e.g., greater than 0.76), the configuration rule 252 can include the action responsive to the firmware update 240 of blocking installation of the firmware update 240 at the information handling system 206. For example, for a low risk score (e.g., less than 0.25), the configuration rule 252 can include the action responsive to the firmware update 240 of installing (or applying) the firmware update 240 at the information handling system 206.

For example, the predicator data 250 can indicate that the battery of the information handling system 206 is experiencing intermittent failures (soft failures), e.g., due to over voltage. The firmware update risk computing module 220 can access the firmware update risk model 230, and based on the battery health as indicated by the predicator data 240, identify the configuration rule 252 associated with the battery health (experiencing intermittent failures). The configuration rule 252 can indicate a high risk, and can indicate computer-implemented actions responsive to the firmware update 240 of only performing the firmware update 240 when the information handling system 206 is connected to AC power source, or selectively applying the firmware update 240 (e.g., skip applying portions of the firmware update 240 that can affect the battery) at the information handling system 206.

For example, the predicator data 250 can indicate that the operating system (OS)_ of the information handling system 206 is experiencing failures/crashes/abnormal shutdowns. The firmware update risk computing module 220 can access the firmware update risk model 230, and based on the failures/crashes/abnormal shutdowns of the OS of the information handling system 206, identify the configuration rule 252 associated with such. The configuration rule 252 can indicate a high risk, and can indicate computer-implemented actions responsive to the firmware update 240 of only updating specific device drivers of the firmware update 240 related to the failures/crashes/abnormal shutdowns before other portions of the firmware update 240 at the information handling system 206; or performing a system restore to a previously known valid restore point prior to applying the firmware update 240 at the information handling system 206.

FIG. 3 illustrates a flowchart depicting selected elements of an embodiment of a method 300 for managing firmware updates of an information handling system. The method 300 may be performed by the information handling system 100, the computing environment 200, the information handling system 202, 204, 206, 208, and/or the firmware update risk computing module 220, and with reference to FIGS. 1-2. It is noted that certain operations described in method 300 may be optional or may be rearranged in different embodiments.

The firmware update risk computing module 220 can perform, at a first time, a calibration and configuration of the firmware update risk model 230 (302). The firmware update risk computing module 220 can identify predictor data 232 associated with the information handling system 204 (304). In some examples, the predictor data 232 can include, for each information handling system 204, hardware context of the information handling system 204, historical information of the information handling system 204, and a firmware state of the information handling system 204. The firmware update risk computing module 220 can train, based on the predictor data 232, the firmware update risk model 230 (306). In some examples, the firmware update risk computing module 220 can generate, based on the predictor data 232 identified at the first time, the configuration policy 234 that includes the configuration rules 236. In some examples, the configuration rules 236 are rules for performing computer-implemented actions responsive to the firmware update 240.

The information handling system 206 can receive, at a second time, the firmware update 240 (308). For example, the information handling system 206 can receive the firmware update 240 from the information handling system 208. The firmware update risk computing module 220 can identify the predictor data 250 of the information handling system 206 (310). For example, the information handling system 206 can provide the predicator data 250 to the information handling system 202. The firmware update risk computing module 220 can, in response to identifying the predictor data 250 of the information handling system 206, access the firmware update risk model 230 including the configuration policy 214 (312). The firmware update risk computing module 220 can further identify one or more of the configuration rules 236 based on the identified predicator data 250 (314). For example, the firmware update risk computing module 220 identifies the configuration rule 252 based on the predicator data 250. The information handling system 206 can apply the configuration rule 252 to perform computer-implemented actions responsive to receiving the firmware update 240 (316).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method for managing firmware updates of an information handling system, comprising:
    performing, at a first time, a calibration and configuration of a firmware update risk model, including:
       identifying predictor data associated with a plurality of information handling systems, the predictor data including, for each information handling system, hardware context of the information handling system, historical information of the information handling system, and a firmware state of the information handling system;
       training, based on the predictor data, the firmware update risk model, including generating a configuration policy including configuration rules, the configuration rules for performing computer-implemented actions responsive to a firmware update;
    receiving, at a second time, the firmware update at a particular information handling system, and in response:
       identifying particular predictor data of the particular information handling system;
       in response to identifying the particular predictor data of the particular information handling system, i) accessing the firmware update risk model including the configuration policy, ii) identifying one or more of the configuration rules based on the identified particular predictor data, and iii) applying the one or more configuration rules to perform computer-implemented actions responsive to receiving the firmware update.

2. The computer-implemented method of claim 1, wherein the hardware context, for each information handling system, includes parameters related to one or more of a hard disk drive of the information handling system, a memory of the information handling system, a battery health of the information handling system, a serial peripheral wear of the information handling system, a fan of the information handling system, and a temperature of the information handling system.

3. The computer-implemented method of claim 1, wherein the historical information, for each information handling system, includes parameters related to one or more of a basic input/output system of the information handling system, previous firmware updates of the information handling system, and an operating system driver relationship.

4. The computer-implemented method of claim 1, wherein the firmware state, for each information handling system, includes parameters related to one or more of basic input/output system settings of the information handling system, and a size of the firmware update.

5. The computer-implemented method of claim 1, wherein generating the configuration policy further includes generating firmware update risk scores based on the predictor data, wherein each of the configuration rules is associated with a range of firmware update risk scores.

6. The computer-implemented method of claim 5, wherein identifying one or more of the configuration rules based on the identified particular predicator data further comprises identifying a particular firmware update risk score based on the particular predicator data, and identifying the one or more configuration rules based on the particular firmware update risk score.

7. The computer-implemented method of claim 1, wherein the one or more computer-implemented actions include applying the firmware update selectively, blocking the firmware update, adjusting a firmware setup configuration, restore and updating recovery files, staging the firmware update, and backing up recovery files.

8. An information handling system comprising a processor having access to memory media storing instructions executable by the processor to perform operations comprising, comprising:
    performing, at a first time, a calibration and configuration of a firmware update risk model, including:
       identifying predictor data associated with a plurality of information handling systems, the predictor data including, for each information handling system, hardware context of the information handling system, historical information of the information handling system, and a firmware state of the information handling system;
    training, based on the predictor data, the firmware update risk model, including generating a configuration policy including configuration rules, the configuration rules for performing computer-implemented actions responsive to a firmware update;
    receiving, at a second time, the firmware update at a particular information handling system, and in response:
       identifying particular predictor data of the particular information handling system;
       in response to identifying the particular predicator data of the particular information handling system, i) accessing the firmware update risk model including the configuration policy, ii) identifying one or more of the configuration rules based on the identified particular predicator data, and iii) applying the one or more configuration rules to perform computer-implemented actions responsive to receiving the firmware update.

9. The information handling system of claim 8, wherein the hardware context, for each information handling system, includes parameters related to one or more of a hard disk drive of the information handling system, a memory of the information handling system, a battery health of the information handling system, a serial peripheral wear of the information handling system, a fan of the information handling system, and a temperature of the information handling system.

10. The information handling system of claim 8, wherein the historical information, for each information handling system, includes parameters related to one or more of a basic input/output system of the information handling system, previous firmware updates of the information handling system, and an operating system driver relationship.

11. The information handling system of claim 8, wherein the firmware state, for each information handling system, includes parameters related to one or more of basic input/output system settings of the information handling system, and a size of the firmware update.

12. The information handling system of claim 8, wherein generating the configuration policy further includes generating firmware update risk scores based on the predictor data, wherein each of the configuration rules is associated with a range of firmware update risk scores.

13. The information handling system of claim 12, wherein identifying one or more of the configuration rules based on the identified particular predicator data further comprises identifying a particular firmware update risk score based on the particular predicator data, and identifying the one or more configuration rules based on the particular firmware update risk score.

14. The information handling system of claim 8, wherein the one or more computer-implemented actions include applying the firmware update selectively, blocking the firmware update, adjusting a firmware setup configuration, restore and updating recovery files, staging the firmware update, and backing up recovery files.

15. A non-transitory computer-readable medium storing software comprising instructions executable by one or more computers which, upon such execution, cause the one or more computers to perform operations comprising:
performing, at a first time, a calibration and configuration of a firmware update risk model, including:
identifying predictor data associated with a plurality of information handling systems, the predictor data including, for each information handling system, hardware context of the information handling system, historical information of the information handling system, and a firmware state of the information handling system;
training, based on the predictor data, the firmware update risk model, including generating a configuration policy including configuration rules, the configuration rules for performing computer-implemented actions responsive to a firmware update;
receiving, at a second time, the firmware update at a particular information handling system, and in response:
identifying particular predictor data of the particular information handling system;
in response to identifying the particular predicator data of the particular information handling system, i) accessing the firmware update risk model including the configuration policy, ii) identifying one or more of the configuration rules based on the identified particular predicator data, and iii) applying the one or more configuration rules to perform computer-implemented actions responsive to receiving the firmware update.

16. The non-transitory computer-readable medium of claim 15, wherein the hardware context, for each information handling system, includes parameters related to one or more of a hard disk drive of the information handling system, a memory of the information handling system, a battery health of the information handling system, a serial peripheral wear of the information handling system, a fan of the information handling system, and a temperature of the information handling system.

17. The non-transitory computer-readable medium of claim 15, wherein the historical information, for each information handling system, includes parameters related to one or more of a basic input/output system of the information handling system, previous firmware updates of the information handling system, and an operating system driver relationship.

18. The non-transitory computer-readable medium of claim 15, wherein the firmware state, for each information handling system, includes parameters related to one or more of basic input/output system settings of the information handling system, and a size of the firmware update.

19. The non-transitory computer-readable medium of claim 15, wherein generating the configuration policy further includes generating firmware update risk scores based on the predictor data, wherein each of the configuration rules is associated with a range of firmware update risk scores.

20. The non-transitory computer-readable medium of claim 19, wherein identifying one or more of the configuration rules based on the identified particular predicator data further comprises identifying a particular firmware update risk score based on the particular predicator data, and identifying the one or more configuration rules based on the particular firmware update risk score.

* * * * *